Patented Mar. 12, 1940

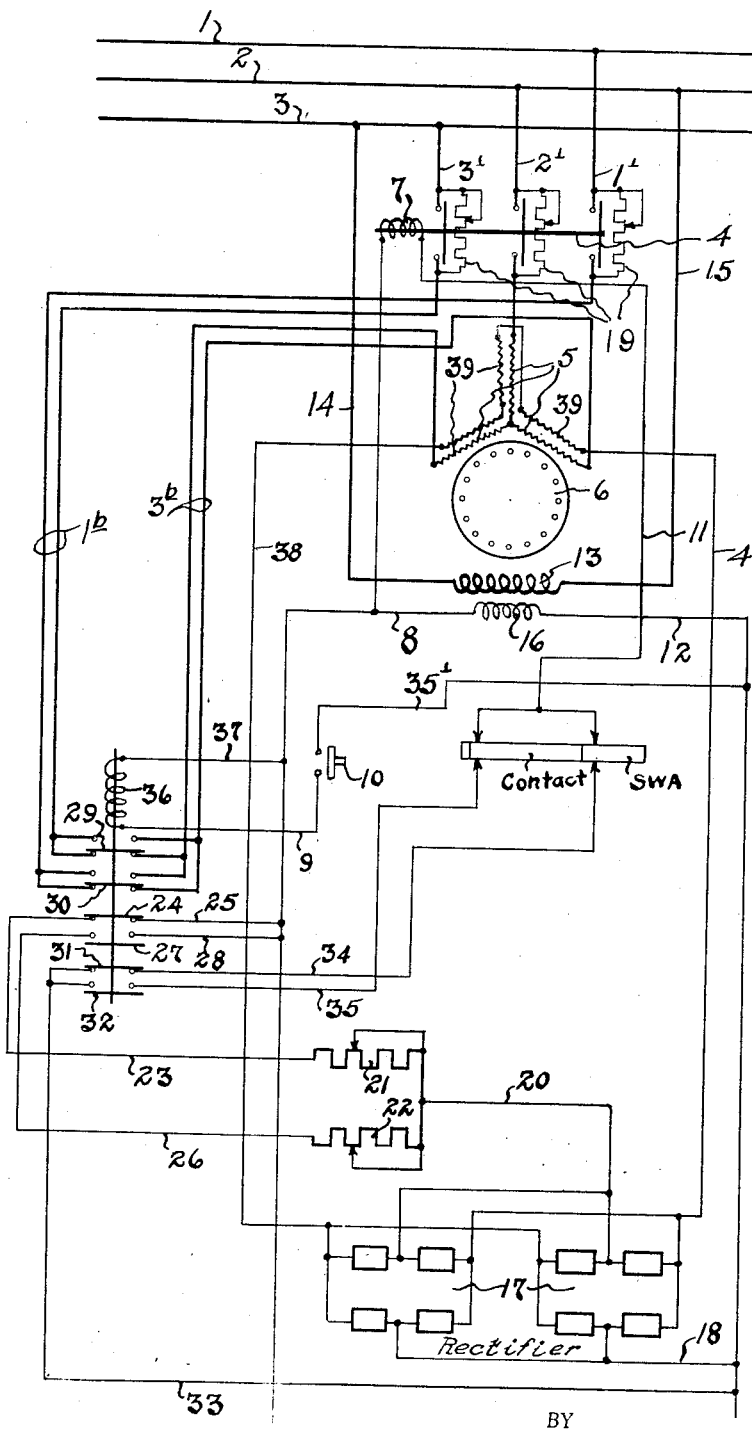

2,193,642

UNITED STATES PATENT OFFICE 2,193,642

ELECTRIC MOTOR CONTROL SYSTEM

Edward G. Parvin, Roselle, N. J., assignor to National Pneumatic Company, Rahway, N. J., a corporation of West Virginia Application March 11, 1939, Serial No. 261,288

7 Claims. (Cl. 172—239)

This invention relates to improvements in electric brakes for electric operators for doors for street cars, elevators, and the like.

The general object of the invention is the provision of an electric motor comprising part of a door operator having incorporated in the field thereof windings for generating a braking action and control circuits therefor.

This invention resides substantially in the combination, construction, arrangement and relative location of parts, all as will be set forth in full detail below.

In the accompanying drawing, the single figure is a diagrammatic illustration of one system in accordance with this invention.

There is illustrated in the drawing a simplified electric door operator system for elevator doors, for example, embodying the essence of the invention herein disclosed. As will be clear to those skilled in the art, the invention may be embodied in practice in more complicated arrangements involving adjuncts which need not be herein disclosed for the purpose of illustrating the invention.

A suitable three-phase power supply circuit for the door operating electric motor is illustrated by the wires 1, 2 and 3. These wires are provided with branches 1', 2' and 3' which are connected to a three-pole relay switch 4 operated by a solenoid 7. The neutral leg 2' of the circuit is directly connected to one of the terminals of the three-phase field winding 5 of the motor which is shown diagrammatically as having a rotor 6. The other two legs of the circuit are connected through the wires 1b and 3b to the reversing contacts 29 and 30 on a multi-pole relay which has the operating solenoid 36. This arrangement is well known in the art and effects an operation of the electric motor in one direction for the position of the multi-pole relay as shown and a reverse operation for its other position when the solenoid 36 is energized.

The primary 13 of a suitable transformer is connected by the leads 14 and 15 across one phase of the polyphase circuit, as for example the wires 2 and 3. Its secondary 16 is provided with a pair of current supply leads 8 and 12. The lead 8 is connected to one terminal of the solenoid 7, as shown, while the other terminal is connected by a wire 11 to a pair of brushes on the door operated switch SWA. A pair of cooperating fixed brushes are connected by the wires 34 and 35 to the terminals of the multipole relay switch, which are controlled by the movable contacts 31 and 32. The corresponding terminals are connected by a wire 33 to the lead 12.

Another set of movable contacts 24 and 27 cooperate with two pairs of fixed contacts, one of each pair being connected respectively by the wires 25 and 28 to the lead 8. The other contacts of these pairs are respectively connected by the leads 23 and 26 to one terminal of each of the resistances 21 and 22. These resistances have a common lead which is connected by the wire 20 to one of the alternating current input terminals of a rectifier 17 and the other input terminal of the rectifier is connected by wire 18 to the lead 12.

At 39 is the brake winding which in an actual physical structure is distributed in the field of the driving motor of the door operating motor. The wire comprising the winding is placed in the slots with the regular field winding 5. The coils comprising the winding are connected in series as indicated in the figure. One terminal of the brake winding is connected by the wire 40 to one of the direct current output terminals of the rectifier 17 and the other terminal is connected by the wire 38 to the other output terminal of the rectifier. At this point it may be noted that the rectifier 17 may be one of any number of rectifiers suitable for this purpose, of which the vacuum tube or copper oxide rectifiers are typical.

One terminal of the solenoid 36 is connected by the wire 37 to the lead 8 while the other terminal is connected by a wire 9 to a switch 10. This switch, in turn, is connected by wire 35' to lead 12.

Each of the pairs of contacts of the switch 4 is bridged by the adjustable resistances 19 so that they are short-circuited when the switch 4 is closed, i. e., magnet 7 is energized.

In describing the operation of this system, it will be assumed that the arrangement in the figure is in door closed position. In order to open the door the operator closes switch 10, it being noted that, if desired, it can be incorporated in the elevator controller, whereupon current flows from lead 8 through wire 37, solenoid 36, wire 9, switch 10 and wire 35' back to lead 12. The solenoid 36 is thus energized, moving all the contacts 29, 30, 24, 27, 31 and 32 from the position shown to their other positions. This causes a circuit to be completed to the solenoid 7. This circuit is from lead 12 through wire 33, switch blade 32, wire 35, the contact on switch SWA, wire 11, solenoid 7 and back to lead 8. The result is that switch 4 is closed and the motor is energized because of the operation of the multi-pole relay switch 36 in a direction to open the door.

Resistances 19 are at this time short-circuited and the door opening motor 5—6 is operating under full power, modified only to the extent that its speed is reduced by the effect produced by the energization of the direct current brake winding 39 in the field thereof. It may be noted that this feature of the invention is disclosed in my co-pending application Serial No. 182,389, filed December 30, 1937. This feature is characterized in that by reason of the energization of the brake the motor more quickly reaches the maximum speed at which it can operate under conditions of adjustment of the circuit, which maximum speed is less than normal maximum speed of the motor, that is, the speed it would attain if the brake winding were not energized. At this time the output voltage of the rectifier 17 is reduced to a desired value by reason of the fact that the adjustable resistance 22 is in the alternating current input circuit thereof so that the direct current energization of the brake winding 39 is reduced.

When the door arrives within a predetermined distance of its full open position, the switch SWA, which is operated by or in conjunction with the door or motor, is moved to a position where its contact breaks the connection between the circuit wires 11 and 35 with the result that solenoid 7 is deenergized and switch 4 opens. This renders the adjustable resistances 19 effective so that the energization of the door motor is now reduced although maintained by reason of the inclusion in its supply circuit of the resistances 19. The door motor thus remains sufficiently energized to cause the door to complete its stroke but at a reduced rate of speed. It is clear, therefore, that, relatively speaking, the braking effect produced by the energized winding 39 will be stronger, tending to cushion the door and motor as the door reaches full open position. When the door is at full open position the field windings 5 of the door may remain energized in a door opening direction to hold the door at full open position.

In order to close the door the operator opens switch 10 which de-energizes solenoid 36, permitting the multi-pole switch operated thereby to return to the position shown in the figure. The result is that solenoid 7 is again energized to close the switch 4 through the circuit including wires 34 and 11, the switch SWA having been moved, as stated above, to a position where its contacts interconnect these two wires. Resistances 19 now being short-circuited, the door motor 5—6 may operate the door towards closed position at its normal energization. At this time the resistance 21 is connected in the alternating current input circuit of the rectifier 17. The adjustment of the reistance 21 with respect to the resistance 22 is desirably different to compensate for the condition, if it exists, that it is easier or harder for the motor to close the door so that it will be moved at the proper speed. As the door approaches within a predetermined distance of closed position switch SWA is operated back to the position shown in the drawing so that the circuit to solenoid 7 is again broken, whereupon switch 4 opens and the energization of the door motor is reduced by reason of the inclusion of the resistances 19 in circuit therewith. Thus the motor operates at a slower speed for the remainder of the stroke, having a reduced energization and the effect of the direct current brake winding 39 being relatively greater. When the door reaches fully closed position it comes readily to a stop without undue slamming and is held closed in that position by reason of the fact that the operating motor 5—6 remains energized in a closing direction.

It is believed that the combination herein disclosed is novel. It is not known that an alternating current motor has ever been provided with a direct current winding to provide a brake directly incorporated in the motor without the use of supplemental braking equipment. It is realized that those skilled in the art will appreciate that various changes may be made in the details of the invention herein disclosed, and it is desired, therefore, not to be limited to the disclosure but rather by the claims.

What I claim is:

1. In an electric door operating system, the combination including an electric motor for operating the door, means for supplying energizing current thereto, an electromagnetic brake associated with said motor, means for supplying an energizing current continuously thereto, and means operated with the door for decreasing while continuing the energization of the motor when the door approaches within a predetermined distance of the end of its stroke in either direction.

2. In a motor control system, an alternating current motor, a direct current brake winding incorporated in said motor, an alternating current energizing circuit for said motor, means for alternately connecting said motor to said alternating current circuit to energize it for operation in either direction, direct current means for continuously maintaining said brake winding energized, and means controlled by the motor for decreasing the energizing current thereto near the end of the stroke of the motor in either direction.

3. In a motor control system, an alternating current motor, a direct current brake winding incorporated in said motor, an alternating current energizing circuit for said motor, control means for alternately connecting said motor to said circuit to energize it for operation in either direction, a source of direct current for continuously maintaining said brake winding energized, and means operated conjointly with said motor for decreasing the energization of said motor near the end of its stroke in either direction.

4. In a motor control system, an alternating current motor, a direct current brake winding incorporated in said motor, an alternating current energizing circuit for said motor, control means for alternately connecting said motor to said circuit to energize it for operation in either direction, an alternating current rectifier having an input circuit, an adjustable resistance in said input circuit for varying the output of said rectifier, connections between the output of said rectifier and said brake winding, and means operated by said motor for decreasing the energization thereof near the end of the operation of the motor in either direction.

5. In a motor control system, the combination including a source of alternating current, an electric motor, control means for connecting said motor to said circuit to energize it for operation in either direction, a direct current brake winding forming part of said motor, an alternating current rectifier connected to said winding to energize it, a pair of resistances, means operated by said control means for alternately connecting said resistances in the input circuit of said rectifier whereby said brake winding is continuously energized, and means operated with said motor for reducing the energization thereof near the end of its stroke in either direction.

6. In an electric door operating system, the combination including an alternating current electric motor adapted to be connected to a door to be operated, means for reversibly supplying current to said motor to operate it in either direction, a brake winding incorporated in the field of said motor, means for continuously supplying a direct current to said winding, and means operated in conjunction with said motor for decreasing the energization thereof near the end of the stroke of the door in either direction.

7. In an electric door operating system, the combination including an electric motor adapted to be connected to a door to be operated, means for reversibly supplying current to said motor to operate it in either direction, a brake winding incorporated in the field of said motor, means for continuously supplying current to said winding, and means operated in conjunction with said motor for decreasing the energization thereof near the end of the stroke in either direction.

EDWARD G. PARVIN.